(No Model.)  3 Sheets—Sheet 1.
G. & A. PFANNKUCHE.
SYSTEM FOR THE DISTRIBUTION OF ELECTRIC ENERGY.
No. 389,974. Patented Sept. 25, 1888.
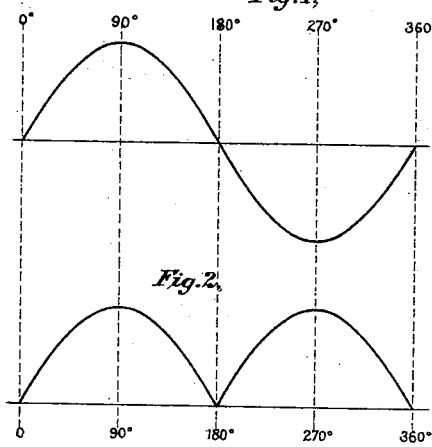
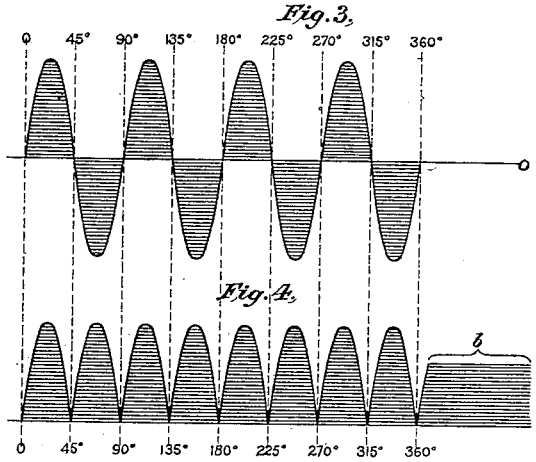
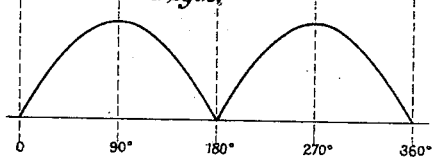
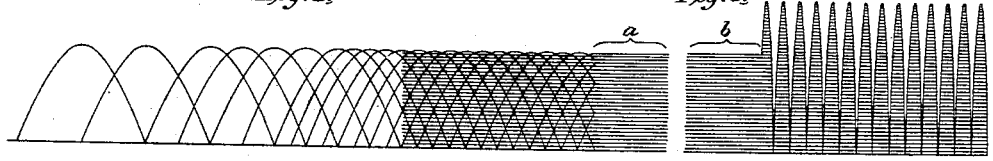
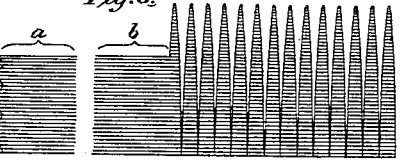
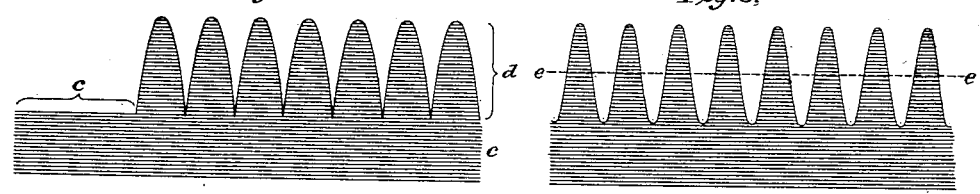
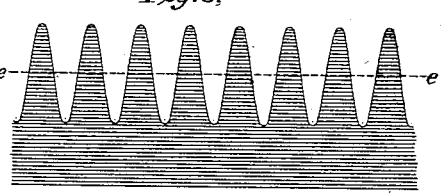
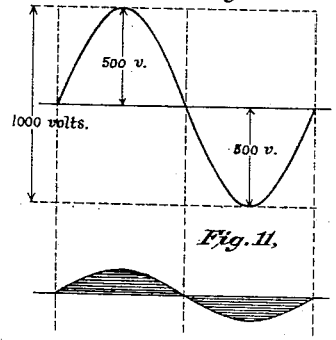
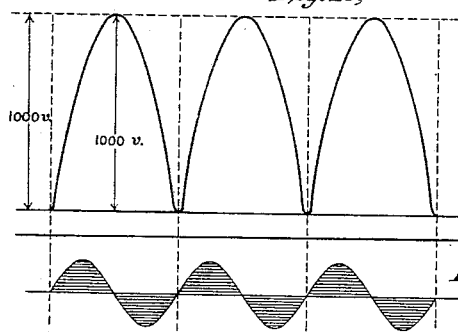
WITNESSES:
Geo. W. Breck
C. E. Ashley
INVENTORS:
Gustav Pfannkuche
Alfred Pfannkuche
By their Attorneys,
Arthur E. Draper (No Model.) 3 Sheets—Sheet 2.
G. & A. PFANNKUCHE.
SYSTEM FOR THE DISTRIBUTION OF ELECTRIC ENERGY.
No. 389,974. Patented Sept. 25, 1888.
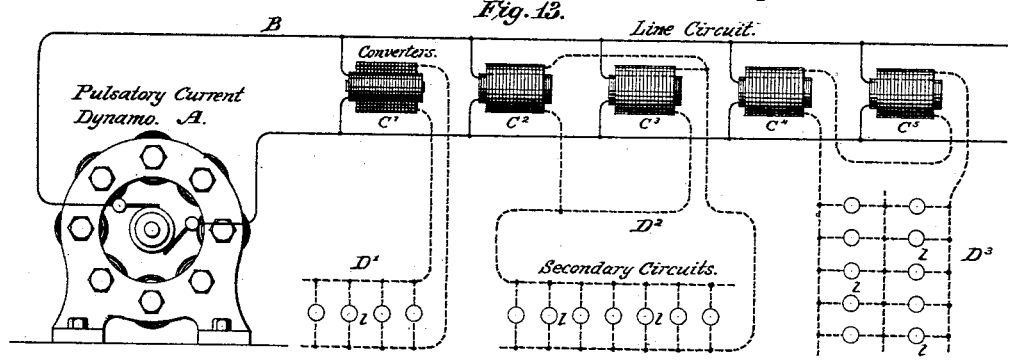
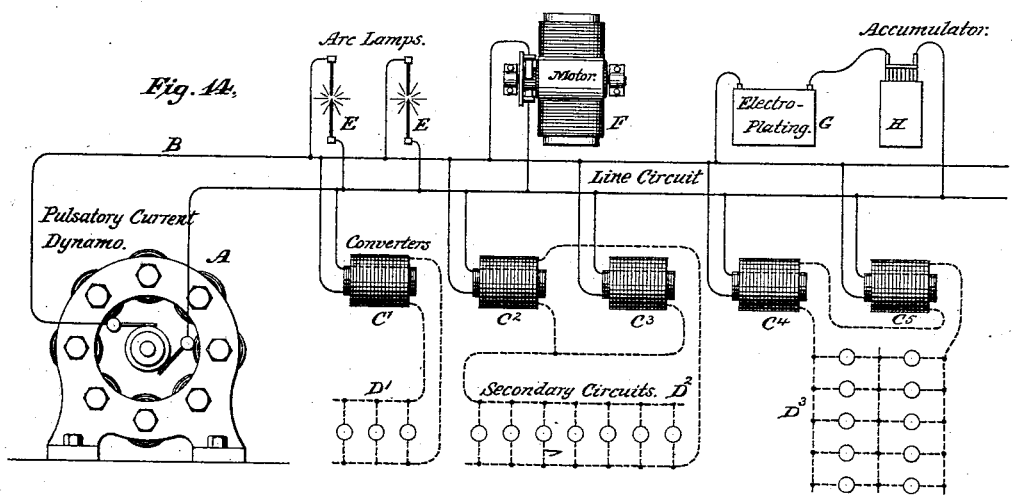
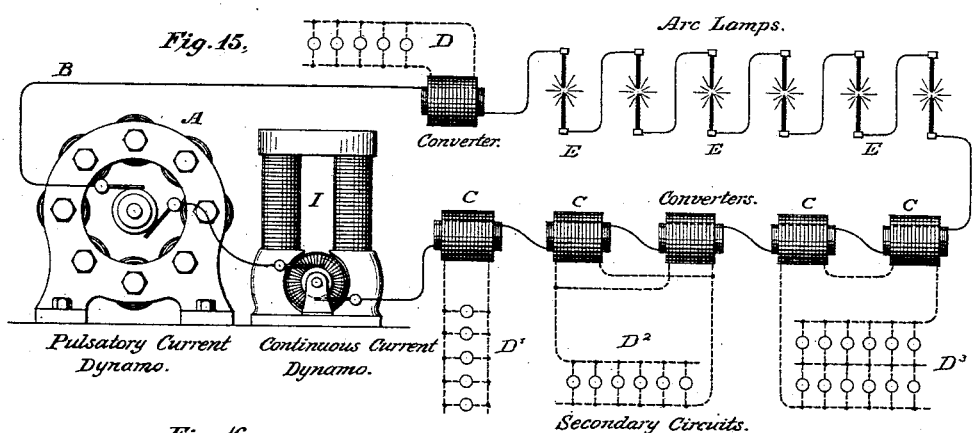
WITNESSES:
Geo. W. Breck
C. E. Ashley
INVENTORS:
Gustav Pfannkuche and
Alfred Pfannkuche
By their Attorneys,
Arthur G. Fraser & Co.

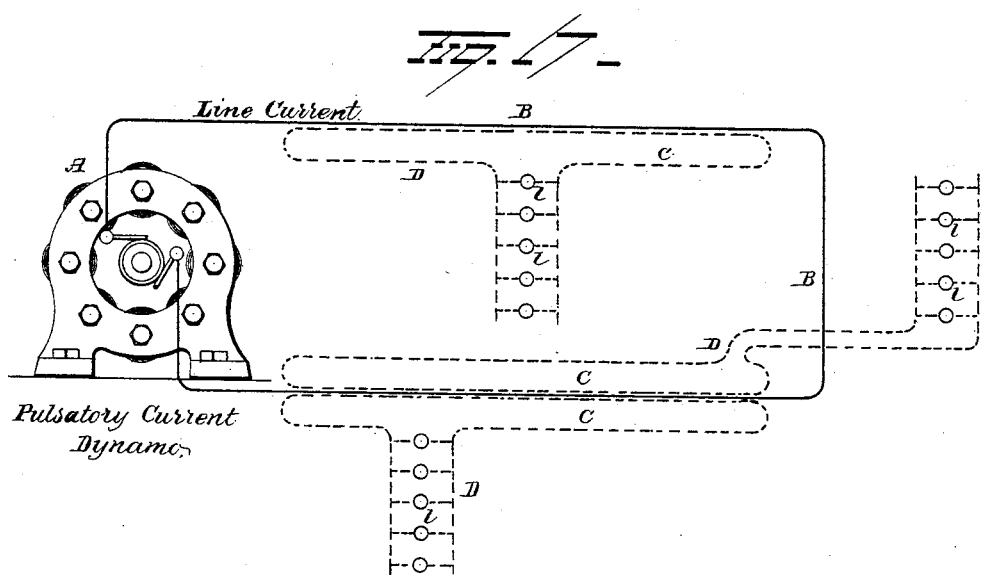

UNITED STATES PATENT OFFICE.

GUSTAV PFANNKUCHE, OF EXETER, NEW HAMPSHIRE, AND ALFRED PFANNKUCHE, OF CLEVELAND, OHIO.

SYSTEM FOR THE DISTRIBUTION OF ELECTRIC ENERGY.

SPECIFICATION forming part of Letters Patent No. 389,974, dated September 25, 1888.

Application filed May 11, 1887. Serial No. 237,839. (No model.)

*To all whom it may concern:*

Be it known that we, GUSTAV PFANNKUCHE and ALFRED PFANNKUCHE, residents, respectively, of Exeter, Rockingham county, in the State of New Hampshire, and of Cleveland, in the State of Ohio, have invented certain new and useful Improvements in Systems of Distribution of Electric Energy, of which the following is a specification.

This invention relates to those systems of distribution of electric energy wherein induction-coils or converters are employed to alter the character of the electrical current before the latter is fed to the electric lamps or other translating (consuming) devices.

In the installation of incandescent electric lamps on the multiple-arc system the currents transmitted are necessarily of low tension, usually about one hundred volts, and of a considerable volume or density, which increases in direct proportion to the number of lamps in the system; hence the main-line conductors for conveying the current must necessarily be of a considerable area of cross-section where many lamps are employed, in order to avoid the loss of a large percentage of potential in transmission. The employment of circuits on this principle for long distances has been found to be impracticable from a commercial point of view in consequence of the great expense of the line conductors, and also because of the waste due to the loss of potential along the lines. To overcome these objections and enable the energy for maintaining incandescent lamps to be transmitted to considerable distances over as small a wire as is commonly employed for arc-lamp circuits, and with as little loss of energy in transit, it has been proposed by a number of inventors to employ upon the line currents of high electro motive force and to transform these currents at one or more distant points into induced currents of low electro motive force and of considerable volume on a local circuit or circuits in which the incandescent lamps are installed in multiple arc. This transformation of current is effected through the medium of induction-coils called "converters" or "transformers."

According to one of the proposed systems the line-circuit is fed by an alternating-current dynamo with alternating currents of high potential, which currents after transmission over the line traverse the high-resistance primary wire of the converters and generate in the low-resistance secondary wires thereof alternating secondary currents of low potential and considerable volume, which currents are fed through a local circuit or circuits to the incandescent lamps which are installed in multiple arc. This system is subject to the disadvantages of employing an alternating-current generator the efficiency of which is not so high as that of generators producing currents of continuous direction and of employing alternating currents upon the line, which currents are practically useless for the feeding of electromotors and for electrolysis and the charging of secondary batteries, and useful only for acting upon the converters and for the feeding of electric candles, so that a circuit operated upon this system cannot be utilized as fully or for as many different purposes as is frequently desirable.

According to another system a continuous generator or generators are employed to feed a circuit in which arc lamps, motors, &c., may be installed, and which circuit terminates at a current-alternating commutator from the take-off brushes of which the line-circuit leads, conveying alternating currents to the distant converters, by means of which alternating currents of low potential are induced in the local circuit by which the incandescent lamps are fed. This system, which is covered by our patent, No. 343,603, dated June 15, 1886, possesses several advantages over that first described, principally in that it enables continuous-current dynamos of higher efficiency to be substituted for the alternating machines used in the first system and enables the current from the one machine or group of machines to be utilized for any of the purposes for which continuous currents of high tension may be used; but it is subject to the disadvantage that the line-circuit leading from the commutator to the converters carries alternating currents, which, as before stated, are useless except for feeding the converters and for electric candles.

It is well known that induction-coils can be operated either by means of alternating currents (or those which change their direction at frequent intervals) or by intermittent currents, (or those which are established, discontinued, and re-established at frequent intervals.) In the former case a secondary current in one direction will result from the transition of the primary current from a positive to a negative potential, and a secondary current of the opposite direction will result from a transition of a primary current from a negative to a positive potential. In the latter case a secondary current in one direction will result from the establishing of the primary current, and a secondary current in the opposite direction will result from the interruption of the primary current. It has accordingly been proposed to operate converters by means of a primary or line circuit carrying intermittent currents. According to one system of this character the circuit from a continuous-current dynamo has been extended to the primary coil of a converter and has been provided with an interrupter, by means of which the circuit has been broken and closed in quick succession. This system would prove impracticable on account of the extreme sparking which would result upon the breaking of the circuit.

Another system of the same general character, but which is somewhat more practicable than that just described, employs a circuit divided into two branches, the undivided portion thereof including the dynamo and the arc lamps or other consuming devices, and the divided portions thereof being fed alternately with electric pulsations diverted to them through the medium of a switch or commutator in such manner that when for an instant the current is traversing one branch of the circuit it will be interrupted in the other branch, and vice versa, the connection of one branch with the undivided circuit being made before that of the other branch is broken. With this system the sparking will be less serious than with that just described; but it will, nevertheless, be so considerable as to practically preclude its use except, perhaps, in cases where the resistance in the branch circuits is very low.

Our present invention aims to provide a system or method of inductive distribution of electric energy which shall possess all the material advantages and be free from all the disadvantages of the prior methods hereinabove recited. To this end we employ in the line-circuit neither alternating nor intermittent currents, but instead thereof we use currents of continuous direction made up of successive waves or pulsations emanating from a generating machine or dynamo of special construction, occurring with sufficient rapidity, having sufficient potential, and being of sufficient volume to adapt them to the conditions for which in any particular case they may be designed.

We will proceed to describe the principle of our invention in detail with reference to Figures 1 to 12, inclusive, of the accompanying drawings, which figures are diagrams illustrating graphically the variations of potential in electric currents of different character.

For the purpose of making clear the principles which we wish to elucidate we will assume the case of a simple armature-coil moving through a uniform magnetic field, as in the Siemens shuttle-wound armature, and disregarding the self-induction of the coil as being irrelevant to our purpose. As such a coil begins to cut the lines of force, it starts with an electro-motive force of zero, and as it moves through the different angles the rate of cutting of lines of force will be proportionate to the co-sines of the angles moved through, and the resulting electro-motive force will be proportional to the sines of those angles. The graphical representation of the rise and fall of potential in such a coil results in a sinuosidal curve of the character shown in Fig. 1, which shows the positive and negative potentials developed during one revolution of the coil. If the coil be provided with an ordinary two-part or split-ring commutator, the alternately positive and negative potentials will be rectified, with the result graphically indicated in Fig. 2. In either case the highest point of the curve is the measure of the highest electro-motive force, there being two such maxima to each revolution, while at two points in each revolution there occur corresponding minima or zero points of electro-motive force. As revolution follows revolution, so do these waves follow each other, all being of the same sign and direction, as graphically indicated in Fig. 4. It is a current of this character which is employed in the system of distribution introduced by our present invention.

In what are known as "continuous current" dynamos the same action takes place that we have just described, with only this difference, that instead of there being only one succession of waves or impulses, as produced by one coil, there is a great number of such waves produced by multiplying the coils, and these waves follow each other in close and regular succession, so that they are superposed one upon another, after the manner indicated in Fig. 5, so that the potential of the current at each instant is equal to the sum of the potentials of these several rising or falling waves occurring at that instant, the result being a potential so nearly constant or continuous that it can be represented with sufficient accuracy by a rectilinear outline, as shown by $a$ at the right-hand end of Fig. 5. Such a current represents the ideal form of continuity and is at present used for almost all electrical purposes, being available not only for electric lighting, but also for the more industrial purposes of electrolysis, charging secondary batteries, and the driving of electromotors. It is to be remarked that a current of this character, while being practically a continuous current, is in theory not perfectly continuous, except in the sense that its potential is continually of one sign, continuity of electro-motive force being really only a matter of degree, depending upon the number of successive superposed waves or impulses.

An alternating current of the kind heretofore employed in inductive systems of electrical distribution is graphically indicated in Fig. 3. Such a current is clearly the opposite of a uniformly-continuous current such as that indicated in Fig. 5. The alternating current is suitable for acting upon an induction-coil or converter, whereas the continuous current is inoperative for this purpose, as is well known.

The pulsatory current of continuous direction indicated in Fig. 4 possesses the essential capabilities of both an alternating and a continuous current. For producing inductive effects it is equally as available as an alternating current, since it is subject to the same incessant rise and fall of potential. In order to substitute such a current for an alternating one, it is only necessary that it shall possess fluctuations of electro-motive force equal in degree to the difference between the opposite extremes of positive and negative potential in the alternating current and recurring with corresponding rapidity, in which case the inductive result will be the same as with the alternating current which has been superseded. Thus such a pulsatory current is suitable for use on the primary circuit of an inductive system of electric distribution in lieu of an alternating current.

The pulsatory current of continuous direction is also essentially identical with a uniformly-continuous current, since it produces the same effect, and may be used in substitution therefor for identical purposes. Both the uniformly-continuous and the pulsatory currents will operate arc lamps, will decompose water, will serve for electrolysis, for charging secondary batteries, for running electromotors, &c., it being only necessary that the waves or impulses shall succeed each other with sufficient rapidity. For such uses the pulsatory current develops an available electro-motive force equivalent to the average of the varying potentials; or, to illustrate it graphically, the available potential is denoted by a line at such height above the zero-line as shall inclose for any given length an area equal to the sums of the areas inclosed by the sinuosidal curves of potentials for an equal length, as shown at $b$ in Fig. 4. In other words, for those uses wherein a continuous current is required the pulsatory current indicated in Fig. 4 is equivalent to a continuous current of the comparative potential shown at $b$ in that figure.

The pulsatory current employed according to our invention is better indicated by Fig. 6, where the pulsations are shown as following each other in more rapid succession. Their rapidity should be such that for the purpose of a continuous current the successive impulses are indistinguishable, whereas for the purposes for which an alternating current is used the rise and fall of potential shall be suitable for producing the best inductive effect. A speed of from one hundred and twenty to two hundred pulsations per second produces the best effect. Such a current is equivalent to a continuous current the potential of which equals the average potentials of the pulsations, as will be seen by comparing the diagram Fig. 5 with the portion $b$ of Fig. 6.

In carrying our invention into practice we build a dynamo which shall produce pulsatory currents of the character indicated in Figs. 2, 4, and 6, and we distribute this current to any desired distance through a suitable circuit, which we may call the "primary" or "line" circuit. In this circuit are included the primary coils of any desired number of inductive converters or transformers, and also, if desired, any other consuming devices, such as arc lamps, electromotors, secondary batteries or accumulators, electro plating baths, &c. The secondary coils of the several converters or transformers are included in one or more local or secondary circuits in which incandescent lamps (or other devices which may be operated by alternating secondary currents) are installed either in multiple arc or in multiple series or other suitable arrangement.

Figs. 13, 14, and 15 of the accompanying drawings are diagrams illustrating the circuits and generating and consuming devices pertaining to our system of electric distribution. Referring to these figures, let A designate a dynamo for generating pulsatory currents; B, the line-circuit fed thereby; C C, the inductive converters or transformers, and D D the local local or secondary circuits.

In Fig. 13 is shown a system for incandescent lighting according to our invention. The primary coils of the converters are connected in multiple between the parallel line-conductors of circuit B. Five converters are shown, numbered $C'$ to $C^5$. The secondaries of the converters are connected to three local circuits, $D'$, $D^2$, and $D^3$. Three different dispositions are shown. The circuit $D'$ is fed by the secondary of converter $C'$ and is provided with a suitable number of incandescent lamps, $l\ l$, installed in multiple. The circuit $D^2$ is fed by two converters, $C^2$ and $C^3$, which are connected to it in multiple, thereby (assuming that the converters are of like proportions) feeding to it a current of the same potential as that of the first circuit, but of double the volume, so that it may maintain double the number of lamps $l\ l$ in multiple. The circuit $D^3$ is fed by two converters, $C^4$ and $C^5$, which are connected in series, and the incandescent lamps $l\ l$ which it supplies are correspondingly installed in multiple series. These three arrangements are shown merely by way of illustration, as the dispositions of local circuits and converters may be varied in any way known in the electrical art.

When the electrical energy is to be distributed over considerable distances, the pulsatory current should be of high tension, proportional to the resistance upon the line, and of suitable volume or density, proportional to the number of converters connected in multiple. The successful operation of this system of installation necessitates that the difference of potential at the terminals of the primary converter-coils shall be constant, and for this purpose a constant difference of potential must be maintained in the main lines and at the dynamo terminals. The regulation to accomplish this end may be effected according to any of the methods heretofore in use for maintaining uniform differences of potentials, which methods are so well understood by electricians that we do not consider it necessary to illustrate or describe them. We prefer to excite the field-magnets of the dynamo by means of shunt-coils and to attach an electrically-actuated governor to the inlet-valve or to the expansion valve-gear of the steam-engine or other source of power. We may, however, employ compound-wound field-magnets for the dynamo or a combination of shunt-coils and separately-excited field coils. Various other expedients for governing the dynamo may be employed, according to the conditions which it is desired to maintain.

The converters or transformers may consist of any suitable construction of induction-coils so wound as to generate in the secondary circuits currents of the desired potential and volume to adapt them to the work to be done. In most instances the primary coil of each converter will be of comparatively fine wire and the secondary coil of comparatively coarse wire and of such lengths relatively to one another that a given primary current of high tension will generate in the secondary coil an alternating current of comparatively low tension, proportioned to the resistance of the incandescent lamps, (usually about one hundred volts,) and of a volume proportioned to the number of lamps that are to be maintained.

Fig. 14 illustrates a distributing system in accordance with our invention which is utilized for various industrial purposes in addition to the maintenance of secondary currents for feeding incandescent lamps, this view being designed to illustrate the applicability of our invention to various uses. We have here illustrated two arc lamps, E E, joined to the main line in multiple arc, an electromotor, F, connected in like manner, and an electroplating bath, G, and accumulator or secondary battery H, connected serially in a derivation of the main circuit. The converters C C, of which five are here shown, have their primary coils connected to the main line in multiple arc in the same manner as shown in Fig. 13, and the secondary circuits, of which three are shown, are also connected precisely as in Fig. 13.

For the operation of the devices E, F, G, and H the pulsatory current has precisely the same effect as a uniformly-continuous current, while, on the contrary, for the operation of the converters the same current has the effect of an interrupted or alternating current, in that it induces secondary currents in the parallel wires of the induction-coils. This applicability of the current from one dynamo to a great variety of diverse uses is a feature of our invention which will prove of great advantage, since it enables one dynamo and one line-circuit to serve the purpose for which heretofore at least two distinct dynamos and circuits have been required—an advantage which will be especially valuable for small installations—as, for instance, in those employed in a single factory where a variety of operations are being carried on by electrical aid. In such a case there may be, for example, one or more arc lamps for outdoor illumination or for the illumination of a large work-room, a number of incandescent lamps for lighting the smaller rooms and offices, a number of electromotors for driving light machinery, and also, perhaps, some electroplating baths or accumulators, all of which may be served by one generator and one circuit. The opportunity which our system affords for economically operating both incandescent lamps and electromotors at a great distance from the generating-station is of itself of great importance, and especially so in view of the more extensive utilization of electromotors for the transmission and utilization of power which prevails at present and which is destined to still further increase in the future.

As a method of inductive distribution of electrical energy our system possesses the following advantages over the system wherein alternating-currents are employed: First, the currents are generated by a dynamo which can be given a higher percentage of efficiency than is possible with dynamos producing alternating currents; second, the governing of the machine can be effected without encountering the difficulties inherent in the govering of alternating-current machines; third, the pulsatory current is available for all the purposes for which a continuous current can be used, as already fully described, whereas an alternating current is useless for most of these purposes; fourth, there is less danger attending the use of a pulsatory current than is the case with an alternating current, and, fifth, the pulsatory current may be passed over the same circuit with a uniformly-continuous current without other loss of energy than would occur if two corresponding continuous currents were so superposed.

Fig. 15 is a diagram showing an installation on our system which is combined with an arc-lamp installation of the usual series arrangement. The one circuit B is fed both by the pulsatory-current dynamo A and by a continuous-current dynamo, I, connected in series, and in this circuit are interpolated serially a number of arc lamps and a number of converters. The dynamos will be regulated to maintain a uniform current the potential of which will be proportional to the resistance of the line and the various arc lamps and primary converter-coils. Thus, instead of employing one circuit supplied by the continuous-current dynamo for feeding the arc lamps and another circuit supplied by the pulsatory-current dynamo for feeding the converters, the one circuit is utilized for both purposes—an installation which would be impossible with the alternating-current induction system. The current traversing this circuit is a uniformly-continuous current having electrical waves or pulsations superposed upon it in the manner indicated graphically in Fig. 7, where the portion $c$ of the current is that generated by the dynamo I and the portion $d$ is that generated by the dynamo A. Since there is here the same vibratory rise and fall of potential as in the pulsatory current alone, (as will be seen by comparing Fig. 7 with Fig. 4,) the effect upon the converters will be precisely the same. It must not be inferred from the diagrams which we have made to illustrate this pulsatory current that the waves of rising and falling potential will have precisely the shape indicated by the curves in the diagrams. These diagrams are introduced merely to illustrate what should be the correct theoretical shape of the potential curves. In practice, however, these curves may, and probably will, deviate somewhat from the theoretical curves shown. For example, in the case of a pulsatory current superposed upon a continuous current the rise and fall of potential may be of such a character as would be graphically indicated by Fig. 8, wherein it will be seen that the transition from a falling to a rising potential is as gradual as is the transition from a rising to a falling potential. In fact, potential waves of this form should produce the best inductive effect, since the resulting induced currents will consist of positive and negative impulses of equal intensity and duration.

The potential curves indicated in Fig. 8 are theoretically those which would be produced by coupling together upon one circuit in series a continuous-current dynamo of a given electro-motive force and an alternating-current dynamo of a considerably less electro-motive force, in which case the alternating machine would, to express it graphically, break the level line of potential resulting from the continuous-current machine into waves or undulations above and below that line. The level line referred to is indicated at $e$ $e$ in Fig. 8. Such a combination of machines might be used to carry out our invention, but their use would not be economical, since there would be a considerable loss of energy, due to the alternating machine generating during half the time an electro-motive force the opposite of that due to the continuous-current machine.

The theoretical potential curves shown in Fig. 4 could be actually realized only by an absolutely accurate setting of the commutator-brushes by the absence of self-induction in the armature-coils and by the absence of residual magnetism in the core of the armature, (if it should have a core.) As these conditions will never occur in practice, this theoretical curve will never be actually obtained; but the actual curve will be more an approximation to that illustrated in Fig. 16, which is a diagram corresponding to Fig. 4. This diagram illustrates how, when the potential falls from its maximum to its minimum, it does not descend actually to zero, but before reaching the zero-line commences its reascent, so that at all times there is a minimum positive potential of greater or less degree, as approximately indicated at $f$. Thus in practice in all cases the conditions shown in Figs. 7 and 8 will be more or less approximated in the sense that waves of rising and falling potential are superposed upon a continuously-uniform sub-current. This condition does not detract from the efficacy of the current except for purely inductive purposes, but, on the contrary, increases its advantage when it is used for feeding electromotors, arc lamps, &c., since at all times there is a well-defined positive current sufficient to maintain a sufficient degree of magnetization in the field-magnet cores of the motor and in the regulating-magnet or solenoid cores of the lamps, thereby preventing loss of energy or efficiency which might be due to the recurrent demagnetization of these cores.

In order to attain a given inductive effect, such as has heretofore resulted from a given alternation of potential in an alternating current, it is only necessary, according to our system, to so construct or proportion the pulsating-current dynamo that it shall generate currents of a fluctuation proportionate in degree to the alternation of potential in the alternating current. For example, if for a given service an alternating current of five hundred volts electro-motive force has been used, as denoted in Fig. 9, thereby producing a difference between the extremes of positive and negative potentials of one thousand volts, we would, according to our system, in order to give the same result, generate a pulsating current the fluctuations of potential in which, or the difference between the maximum and minimum potentials, should equal one thousand volts, as denoted in Fig. 10. The resulting secondary current will then be the same in either case, with the exception that if, according to our system, the dynamo be constructed with as many fields and be driven with the same speed as in the case of the alternating-machine, the number of alternations of current in the secondary converter-coils will be twice as great under our system as with the alternating current, as is clearly indicated in Figs. 11 and 12, which show, respectively, the secondary currents resulting from or induced by the primary currents denoted in Figs. 9 and 10. If the secondary currents are desired to have the same rapidity of alternation as in the case of the alternating-current system, we have only to construct our pulsating dynamo in such manner that it shall generate only one-half the number of pulsations in a given time. For example, if in either case the secondary currents were desired to have three hundred alternations per second, the alternating-current dynamo must generate three hundred pulsations per second—that is, one hundred and fifty positive and one hundred and fifty negative pulsations—while with our system the dynamo need generate only one hundred and fifty pulsations per second.

In the installation of a distributing system according to our invention the translating or consuming devices (as converters, motors, arc lamps, &c.) may be connected to the primary circuit according to any electrical system that may be preferred, either in multiple arc in series, in multiple series, or in series multiple. We have illustrated an example of the former method—namely, the multiple-arc arrangement—in Figs. 13 and 14 and an example of the series arrangement in Fig. 15. These installations will be modified, or any other method known to the art of the electrical engineer will be employed, as circumstances or judgment may dictate.

The induction-coils or converters to be used with our system may be of any suitable kind now known or that may hereafter be devised. The construction shown in our patent, No. 343,602, dated June 15, 1886, is well suited to the purpose. Other suitable constructions of such coils or induction apparatus will be embodied in two other applications which we are about to file.

The induction apparatus or device that we have herein referred to as a converter or transformer need not be actually an induction-coil, nor need it be any of the known or recognized constructions of such converters. All that is essential is that some portion of a secondary circuit shall be brought into the inductive field created by the rising and falling potential in the primary circuit, so that the secondary circuit shall be inductively affected by such field, with the result of generating an alternating current in the secondary circuit. Fig. 17 is a diagram illustrating all that is essential in this respect in its simplest form. In this figure a portion of the wire of each secondary circuit extends parallel with the wire of the primary circuit, so as to be within the inductive field thereof. The adjacent portions of the primary and secondary wires in this figure constitute essentially what we have hereinbefore referred to as the primary and secondary coils of the converter.

We claim as our invention the following-defined novel features and combinations, substantially as hereinbefore set forth, namely:

1. The art or method of electrical distribution, which consists in charging a line-circuit with a continuous current of uniform direction and of rapidly rising and falling potential, and thereby generating in one or more secondary circuits located within inductive proximity of the line-circuit alternating currents of lower potential and utilizing said alternating currents to feed electric translating devices, substantially as described.

2. The art or method of electrical distribution, which consists in establishing a continuous but pulsatory current of uniform direction in a line-circuit and thereby generating in one or more local circuits traversing the inductive field of the line-circuit alternating currents of lower potential than the average potential of the line-current and utilizing said alternating currents to feed electric consuming devices, substantially as described.

3. The art or method of electrical distribution, which consists in charging a primary circuit with a continuous pulsatory current of uniform direction and of comparatively high average tension, and thereby generating in one or more secondary circuits alternating secondary currents of greater volume and lower tension than that of the primary current and feeding by said secondary current electric incandescent lamps or equivalent translating devices, substantially as described.

4. In a system of electric distribution, the combination of a generating and commutating mechanism producing a pulsatory current of continuous direction, a primary circuit receiving said current, an electric consuming device (as a motor, arc lamp, &c.) installed in said circuit and operated by the current as by a continuous current, an inductive converter with its primary wire installed in said circuit, whereby by the rise and fall of potential in the primary circuit an alternating current is induced in the secondary wire of the converter, a secondary circuit connected to said secondary wire and receiving said induced current, and electric consuming devices (as incandescent lamps) installed in said secondary circuit and fed by such alternating current.

5. In a system of electric distribution, the combination of a primary circuit, an inductive converter with its primary wire installed therein, electric consuming devices (such as arc lamps, motors, &c.) designed for operation by a continuous current installed in said circuit, a secondary circuit connected to the secondary wire of said converter, a continuous-current dynamo connected to said primary circuit, and a pulsatory-current dynamo, also connected to said primary circuit, whereby a continuous current for feeding said electric-consuming devices and a pulsatory current for operating said converter are superposed upon the same circuit.

6. In a system of electric distribution, the combination of a dynamo constructed for the production of rapidly successive pulsations of rising and falling potential and of continuous direction, with a primary circuit fed thereby, an inductive converter with its primary wire in said circuit, and a secondary circuit, including the secondary wire of said converter.

In witness whereof we have hereunto signed our names, each in the presence of two subscribing witnesses.

GUSTAV PFANNKUCHE.
ALFRED PFANNKUCHE.

Witnesses to the signature of Gustav Pfannkuche:
GEORGE H. FRASER,
AUTHUR C. FRASER.

Witnesses to the signature of Alfred Pfannkuche:
J. A. OSBORNE,
I. S. WINSOR.